(12) United States Patent
Maguire

(10) Patent No.: US 11,230,944 B2
(45) Date of Patent: Jan. 25, 2022

(54) HEAT SHIELD FOR GAS TURBINE FLUID TUBES

(71) Applicant: United Technologies Corporation, Farmington, CT (US)

(72) Inventor: Becklyn A. Maguire, East Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 143 days.

(21) Appl. No.: 16/692,559

(22) Filed: Nov. 22, 2019

(65) Prior Publication Data

US 2021/0156278 A1 May 27, 2021

(51) Int. Cl.
*F01D 25/14* (2006.01)
*F01D 9/06* (2006.01)
*F01D 25/30* (2006.01)

(52) U.S. Cl.
CPC ........... *F01D 25/145* (2013.01); *F01D 9/065* (2013.01); *F01D 25/30* (2013.01); *F05D 2240/15* (2013.01)

(58) Field of Classification Search
CPC ....... B21C 37/06; B21C 37/10; B21C 37/102; B21C 37/12; B21C 37/121; B21C 37/101; F01D 25/145; F01D 25/30; F01D 9/065; F05D 2240/15
See application file for complete search history.

(56) References Cited

U.S. PATENT DOCUMENTS

| 3,058,861 | A | | 10/1962 | Rutter |
| 3,783,497 | A | * | 1/1974 | Griesinger .............. B21C 37/06 29/460 |
| 4,840,201 | A | * | 6/1989 | Botsolas ................. F16L 59/11 138/149 |
| 4,993,918 | A | * | 2/1991 | Myers ..................... F01D 9/065 415/191 |
| 5,916,137 | A | * | 6/1999 | Hayashi ................ F01N 13/185 60/323 |
| 6,401,320 | B1 | | 6/2002 | Lupke et al. |
| 7,451,541 | B2 | * | 11/2008 | Stastny ..................... F16L 9/17 138/157 |
| 8,596,959 | B2 | * | 12/2013 | Durocher ............... F01D 9/065 415/110 |
| 9,458,954 | B2 | | 10/2016 | Baur et al. |
| 9,777,875 | B2 | | 10/2017 | Bobo |
| 9,982,579 | B2 | * | 5/2018 | Socha ..................... F01D 9/065 |

(Continued)

FOREIGN PATENT DOCUMENTS

| GB | 144136 | 8/1976 |
| WO | 1992005381 | 4/1992 |

*Primary Examiner* — Jesse S Bogue
(74) *Attorney, Agent, or Firm* — Carlson, Gaskey & Olds, P.C.

(57) ABSTRACT

A gas turbine engine includes a compressor section. A diffuser case is downstream of the compressor section. There is a combustor and a turbine section. A bearing compartment is inward of the combustor. A shaft connects the turbine section to the compressor section. The bearing compartment includes a bearing that supports the shaft. A plurality of tubes extend to the bearing compartment. Each of the plurality of tubes have a heat shield that includes a first half and a second half crimped together along lateral edges.

19 Claims, 7 Drawing Sheets

(56) References Cited

U.S. PATENT DOCUMENTS

| | | | |
|---|---|---|---|
| 2006/0219357 A1* | 10/2006 | Isono | F01N 13/10 |
| | | | 156/292 |
| 2008/0056892 A1* | 3/2008 | Barton | F04D 29/444 |
| | | | 415/191 |
| 2008/0169038 A1 | 7/2008 | Sellis et al. | |
| 2011/0252775 A1* | 10/2011 | Joergl | F01N 13/102 |
| | | | 60/321 |
| 2015/0285147 A1* | 10/2015 | Phillips | F01D 25/125 |
| | | | 60/726 |
| 2016/0258322 A1* | 9/2016 | Winn | F01D 25/145 |
| 2016/0326910 A1* | 11/2016 | Socha | F01D 25/18 |

* cited by examiner

HEAT SHIELD FOR GAS TURBINE FLUID TUBES

BACKGROUND

This application relates to heat shields for fluid tubes used in gas turbine engines.

A gas turbine engine typically includes a fan section, a compressor section, a combustor section and a turbine section. The fan delivers air into a bypass duct as propulsion air. Air enters the compressor section, is compressed and delivered into the combustion section where it is mixed with fuel and ignited to generate a high-speed exhaust gas flow. The high-speed exhaust gas flow expands through the turbine section to drive the compressor and the fan section.

Because of the heat generated by the gas turbine engine, fluid tubes traveling through parts of the gas turbine engine may need a heat shield to shield the tube and/or the fluid traveling in the tube from the heat generated in the gas turbine engine.

Further details of the present disclosure will be apparent from the detailed description and figures included below.

SUMMARY

In one exemplary embodiment, a gas turbine engine includes a compressor section. A diffuser case is downstream of the compressor section. There is a combustor and a turbine section. A bearing compartment is inward of the combustor. A shaft connects the turbine section to the compressor section. The bearing compartment includes a bearing that supports the shaft. A plurality of tubes extend to the bearing compartment. Each of the plurality of tubes have a heat shield that includes a first half and a second half crimped together along lateral edges.

In a further embodiment of any of the above, at least one of the plurality of tubes supplies a source of air to the bearing compartment.

In a further embodiment of any of the above, at least one of the plurality of tubes discharges air from the bearing compartment.

In a further embodiment of any of the above, at least one of the plurality of tubes supplies a source of oil to the bearing compartment.

In a further embodiment of any of the above, at least one of the plurality of tubes discharges oil from the bearing compartment.

In a further embodiment of any of the above, the plurality of tubes extends through the diffuser case.

In a further embodiment of any of the above, the first heat shield half and the second heat shield half crimped together form an internal circular shape.

In a further embodiment of any of the above, the first half of the heat shield includes a plurality of flanges along each lateral edge of the first half. The second half includes a plurality of crimp flanges along each lateral edge of the second half.

In a further embodiment of any of the above, the first half of the heat shield includes a continuous crimp flange along each lateral edge. The second half of the heat shield includes a continuous flange along each lateral edge.

In a further embodiment of any of the above, the plurality of tubes extends through the diffuser case.

In a further embodiment of any of the above, the first heat shield half and the second heat shield half crimped together form an internal circular shape.

In a further embodiment of any of the above, the first half of the heat shield includes a plurality of flanges along each lateral edge of the first half. The second half includes a plurality of crimp flanges along each lateral edge of the second half.

In a further embodiment of any of the above, the first half of the heat shield includes a continuous crimp flange along each lateral edge. The second half of the heat shield includes a continuous flange along each lateral edge.

In a further embodiment of any of the above, the first heat shield half and the second heat shield half crimped together form an internal circular shape.

In a further embodiment of any of the above, the first half of the heat shield includes a plurality of flanges along each lateral edge of the first half. The second half includes a plurality of crimp flanges along each lateral edge of the second half.

In a further embodiment of any of the above, the first half of the heat shield includes a continuous crimp flange along each lateral edge. The second half of the heat shield includes a continuous flange along each lateral edge.

In another exemplary embodiment, a self-retaining heat shield includes a first heat shield half that has an arc shape that extends between a pair of lateral edges. The pair of lateral edges each include at least one first flange. A second heat shield half has an arc shape that extends between a pair of lateral edges. The pair of lateral edges each include at least one second flange. One of the at least one first flange and the at least one second flange is a crimp flange. The other of the at least one first flange and the at least one second flange is a straight flange. The at least one first flange is aligned adjacent to the at least one second flange.

In a further embodiment of any of the above, the crimp flange at least partially surrounds the straight flange.

In a further embodiment of any of the above, the at least one first flange forms a mating connection with the at least one second flange.

In another exemplary embodiment, a gas turbine engine includes a tube. A heat shield surrounds the tube and includes a first heat shield half that has an arc shape that extends between a pair of lateral edges. The pair of lateral edges each include at least one first flange. A second heat shield half has an arc shape that extends between a pair of lateral edges. The pair of lateral edges each include at least one second flange. One of the at least one first flange and the at least one second flange is a crimp flange. The other of the at least one first flange and the at least one second flange is a straight flange. The at least one first flange is aligned adjacent to the at least one second flange.

These and other features can be best understood from the following specifications and drawings.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
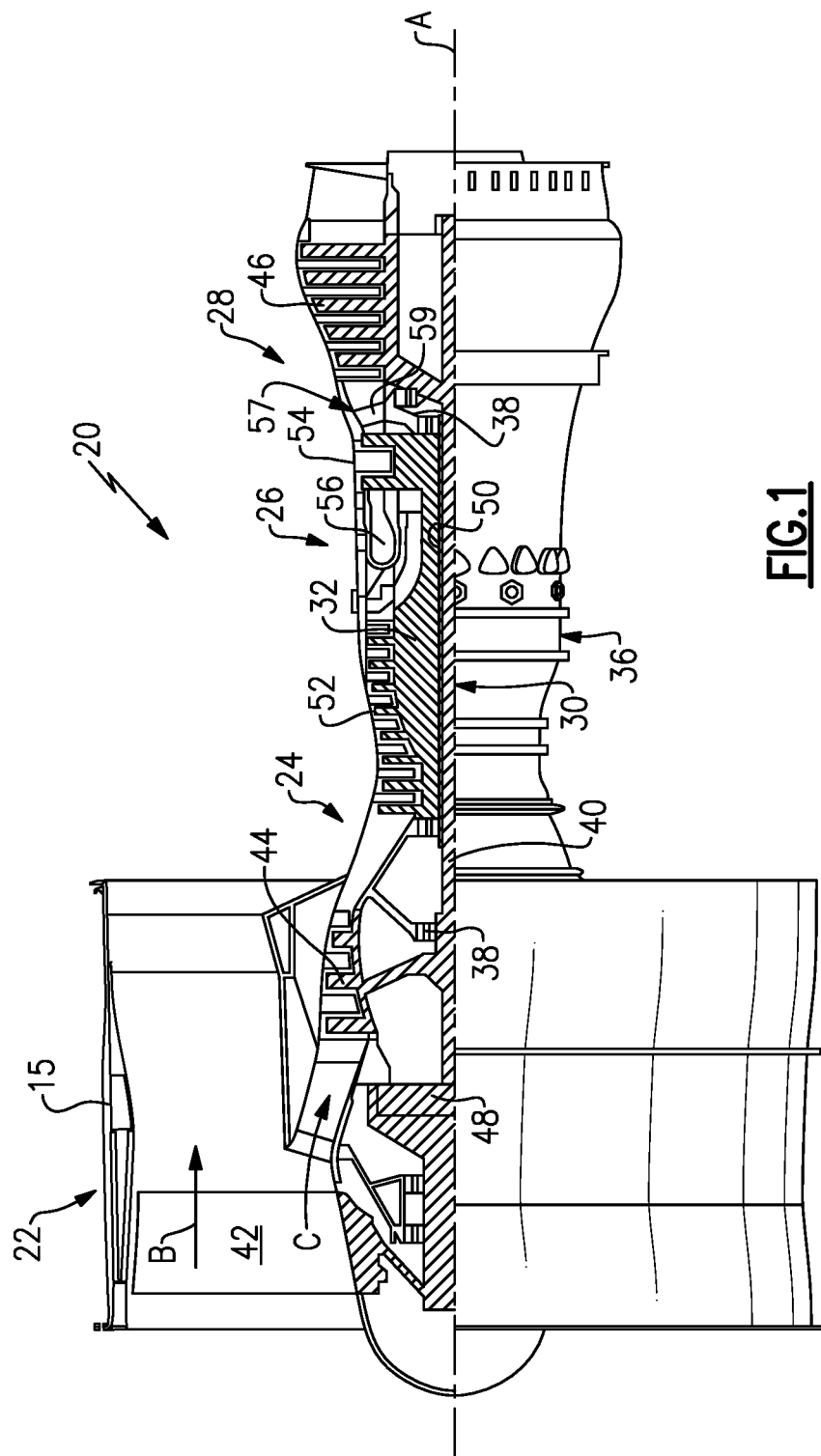
FIG. 1 is a schematic view of an example gas turbine engine according to a non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
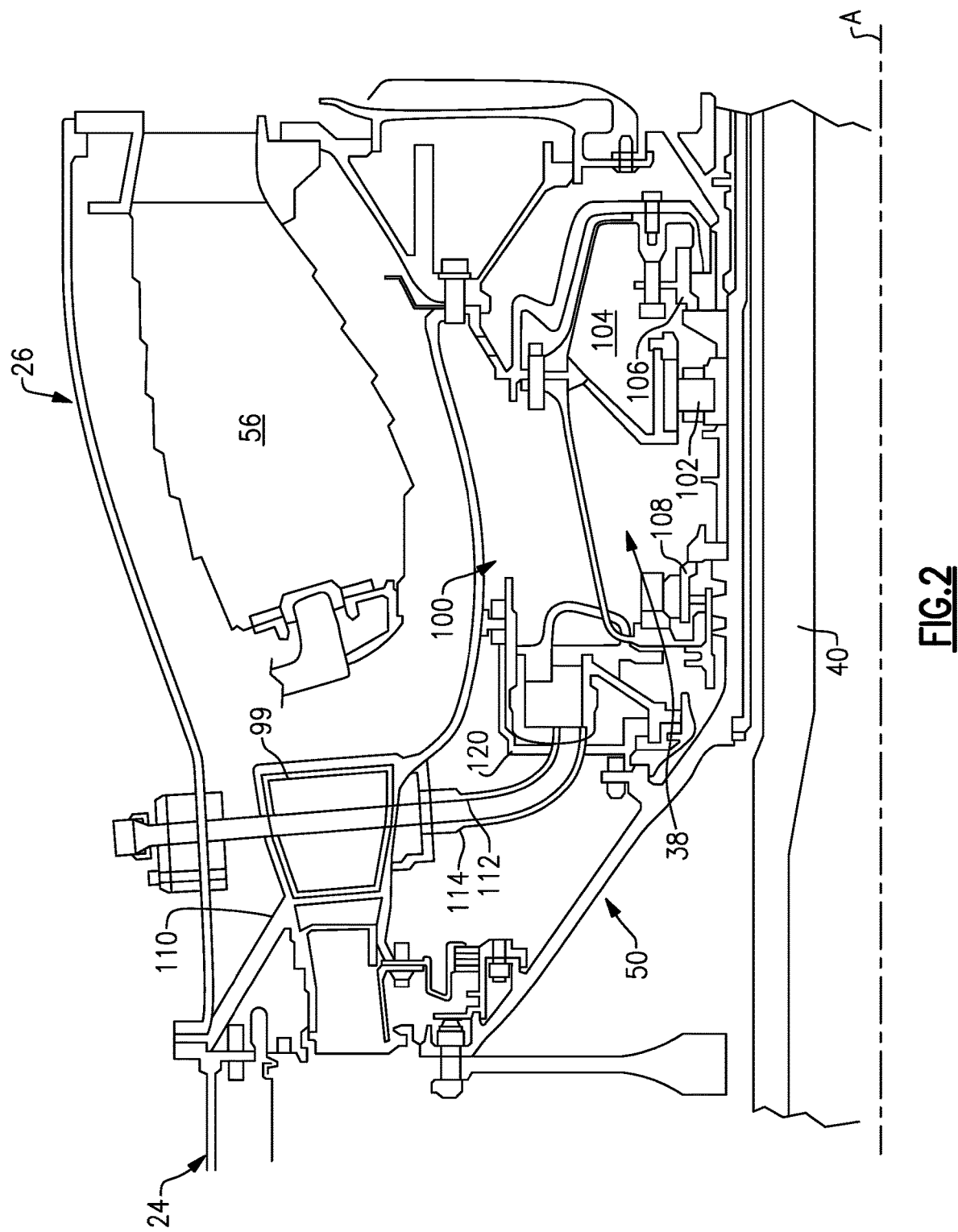
FIG. 2 illustrates a cross-sectional view of a combustor section in the gas turbine engine of FIG. 1.

FIG. 2 schematically illustrates the combustor section 26 with the combustor 56. A bearing compartment 100 is located radially inward of the combustor 56. In this disclosure, radial or radially is in relation to the engine axis A unless stated otherwise. A bearing 102 is located in a bearing compartment 104 and supports the outer shaft 50 relative to an engine static structure. Seals 106 and 108 are positioned on opposite axial sides of the bearing 102. A diffuser case 110 is located downstream of the compressor section 24 and encompasses the combustor 56 and bearing compartment 104.

A tube 112 extends radially inward through a vane 99 in the diffuser case 110 and turns and extends axially downstream through an endwall 120 to the bearing compartment 104. A heat shield 114 at least partially surrounds the tube 112. As will be appreciated, although the examples herein are described in the context of the tube 112 in the combustor section 26, this disclosure is not limited to tubes 112 in combustor sections 26, and the examples may also be applicable to other tubes that are located other high temperature regions in the gas turbine engine 20.

The heat shield 114 insulates and protects the tube 112 from elevated temperatures. As will be explained below, the heat shield 114 is fastened around the tube 112 by crimping which forms a tight and smooth connection and eliminates the use of small fasteners or lock-wire for installation of the heat shield 114. The crimped connection on the heat shield 114 is vibration resistant and resilient against separation.

Figure 3:
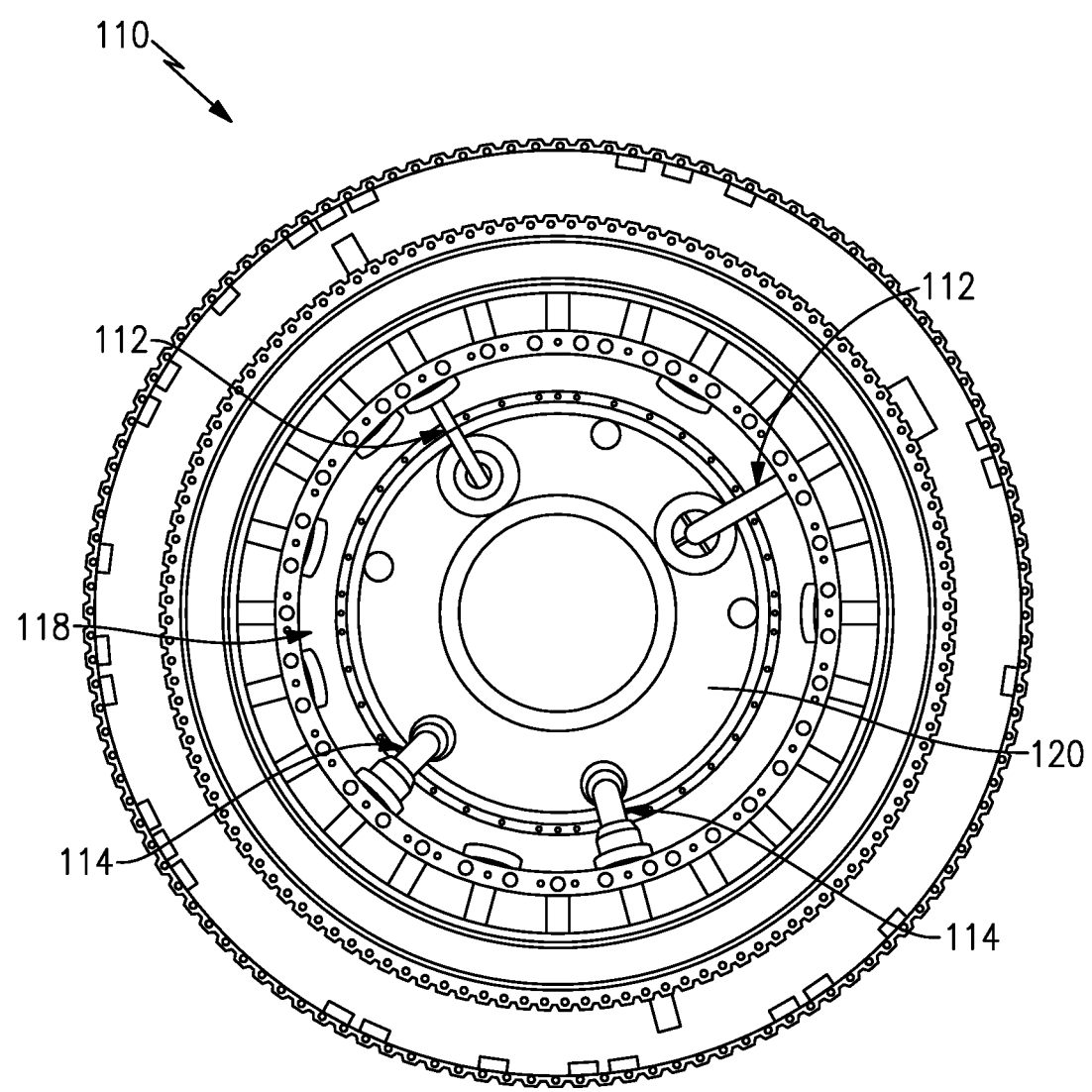
FIG. 3 illustrates an aft end of a diffuser case.

As is shown in FIGS. 2 and 3, a plurality of the tubes 112 extend through the diffuser case 110 and between an outer wall 118 and the endwall 120. In the illustrated example, one of the plurality of tubes 112 is an oil supply line to the bearing compartment 104, another one of the plurality of tubes 112 is an oil discharge line from the bearing compartment 104, another one is an air discharge line from the bearing compartment 104, and another one is an air supply line to the bearing compartment 104. However, two of the plurality of tubes 112 in FIG. 3 are surrounded by a corresponding heat shield 114 in the illustrated example.

Figure 4A:
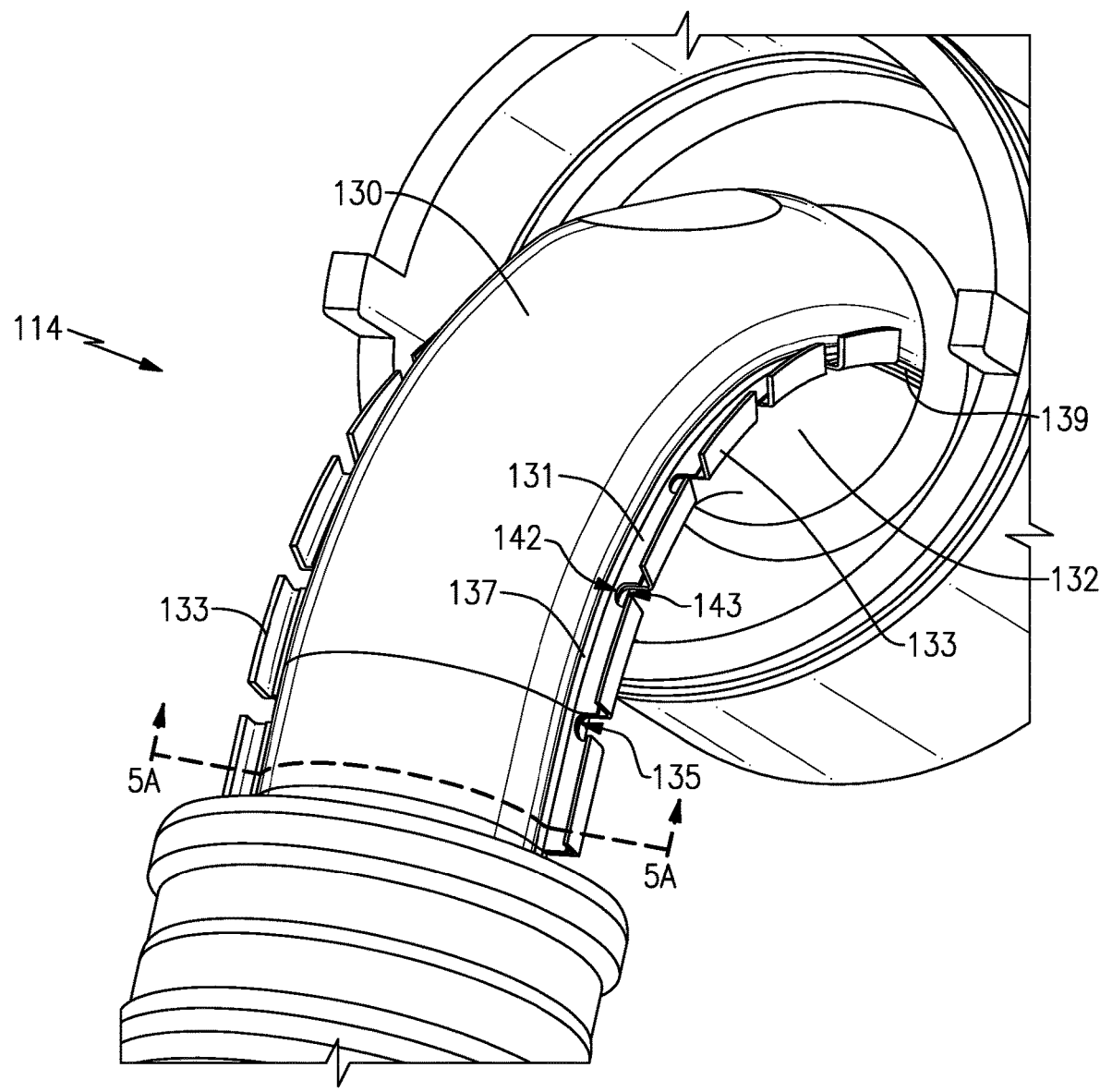
FIG. 4A illustrates an example heat shield having a plurality of flanges in an uncrimped position.
Figure 5A:
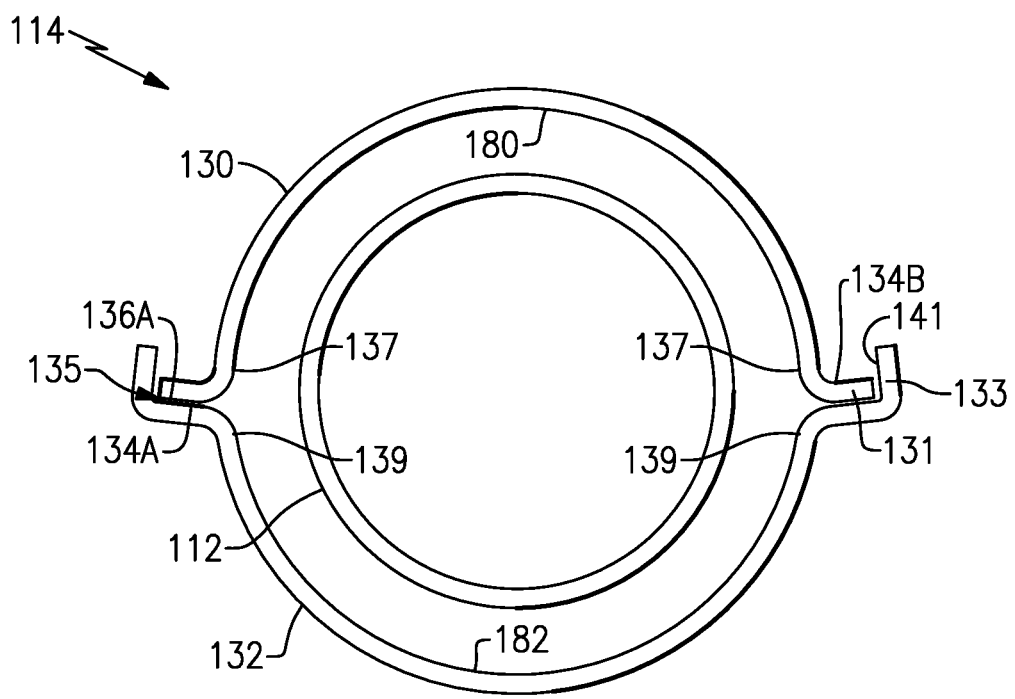
FIG. 5A illustrates a cross-sectional view taken along line 5A-5A of FIG. 4A.

FIGS. 4A and 5A illustrate the example heat shield 114 surrounding the tube 112. The heat shield 114 includes a first heat shield half 130 and a second heat shield half 132 with the first heat shield half 130 on an outer side of a bend and the second heat shield half 132 on an inner side of the bend. The first heat shield half 130 includes an arc shaped segment 180 that extends between lateral edges 137 of the arc shaped segment 180. The first heat shield half 130 also includes a plurality of straight flanges 131 that extend outward and generally perpendicular to the lateral edges 137. The straight flanges 131 includes a first side having a first mating surface 134A and a second opposite side having a crimp engagement surface 134B. The plurality of straight flanges 131 are separated by arc shaped discontinuities 142 to reduce stress concentrations of the intersection of the straight flanges 131 and the lateral edges 137.

The second heat shield half 132 includes an arc shaped segment 182 that extends between lateral edges 139 of the arc shaped segment 182. The second heat shield half 132 also includes a plurality of crimp flanges 133 having an "L" shape that extends outward and generally perpendicular to the lateral edges 139. The crimp flanges 133 include a first mating surface 136A for engaging the first mating surface 134A on the first heat shield half 132 to form a mating connection 135. The crimp flanges 133 also include a crimp surface 141 for engaging the crimp engagement surface 134B on the first heat shield half 132 when the crimp flanges 133 are crimped around the straight flanges 131 as will be described in greater detail below. The plurality of crimp flanges 133 are separated by arc shaped discontinuities 143 to reduce stress concentrations of the intersection of the crimp flanges 133 and the lateral edges 139.

Figure 4B:
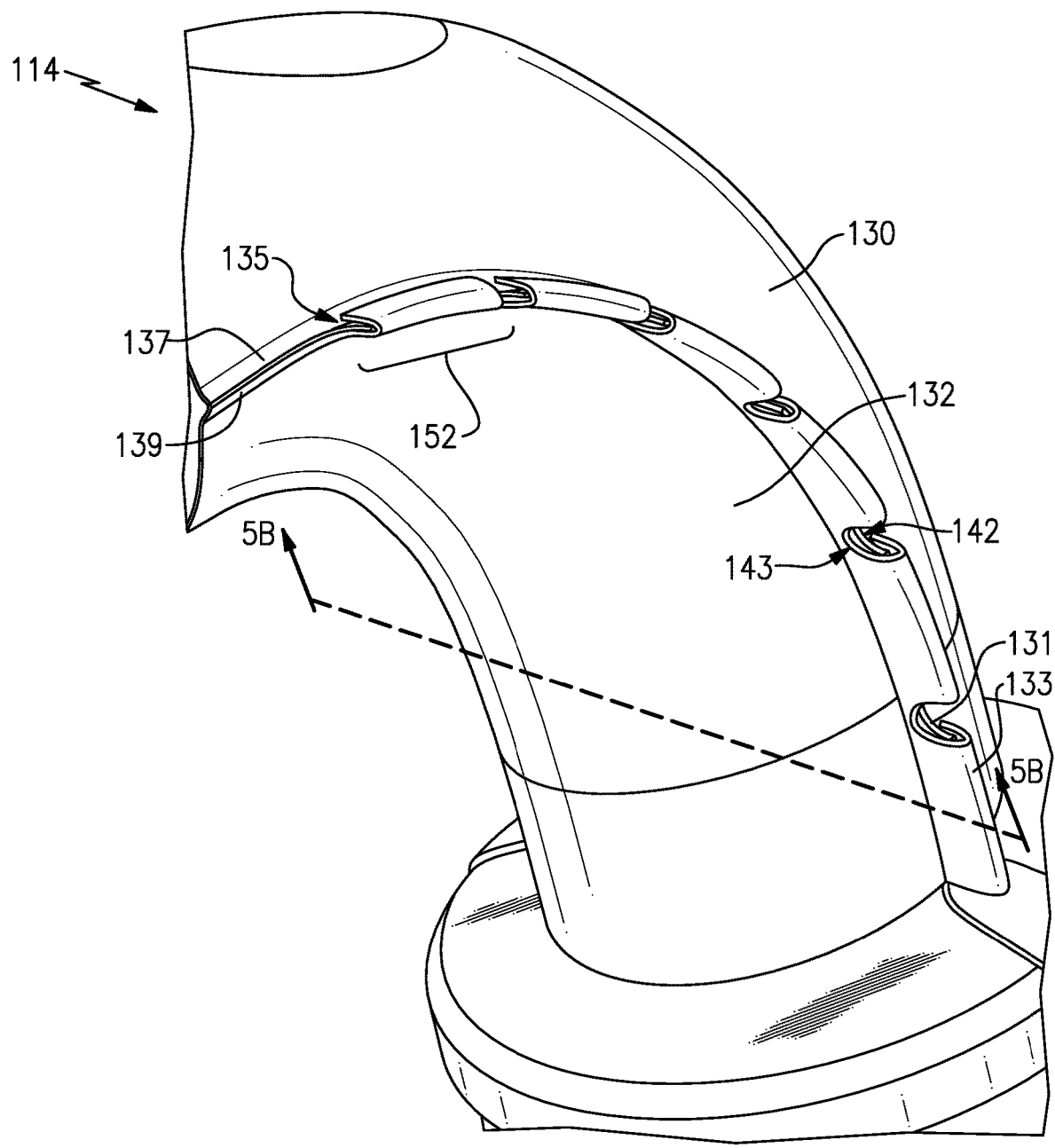
FIG. 4B illustrates the example heat shield of FIG. 4A with the plurality of flanges in a crimped position.
Figure 5B:
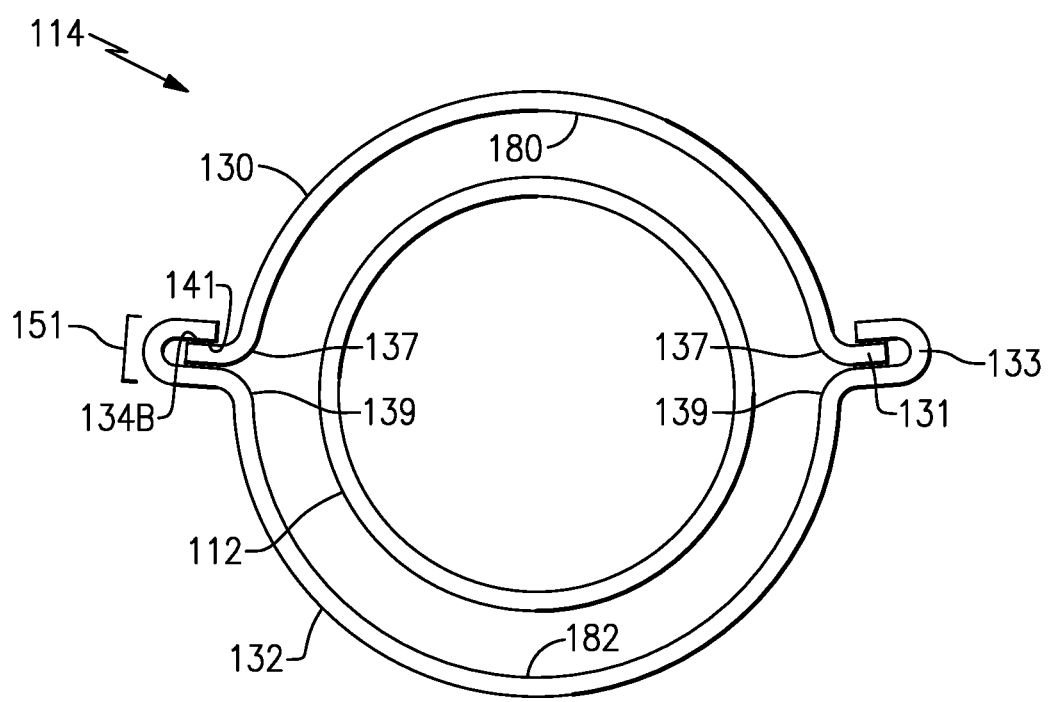
FIG. 5B illustrates a cross-sectional view taken along line 5B-5B of FIG. 4B.

FIGS. 4B and 5B further illustrate the heat shield 114 with the crimp flanges 133 on the second heat shield half 132 crimped around the straight flanges 131 on the first heat shield half 130. In this example, the crimp flanges 133 are crimped over the plurality of straight flanges 131 creating a crimped section 151. The crimp surface 141 on the crimp flange 133 engages the crimp engagement surface 134B on the straight flange 131.

The plurality of crimp flanges 133 are crimped over the plurality of straight flanges 131 using a high-force sheet metal crimper, preferably, creating the crimped section 151. The crimped section 151 is shown having a "U" shape, which seals the first and second heat shield halves 130, 132 to one another. Thus, a vibration resistant configuration is achieved. The crimped section 151 can be further squeezed as necessary to ensure a tight fit has been established.

Figure 6A:
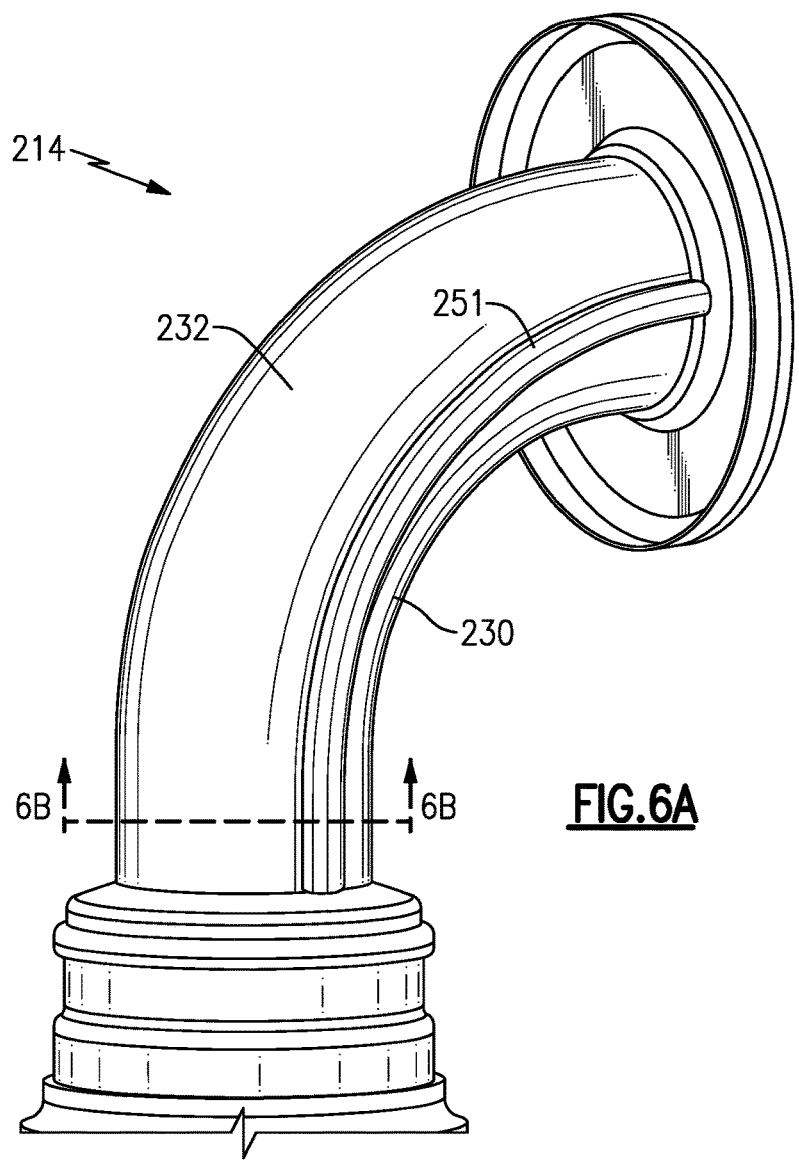
FIG. 6A illustrates another example heat shield.
Figure 6B:
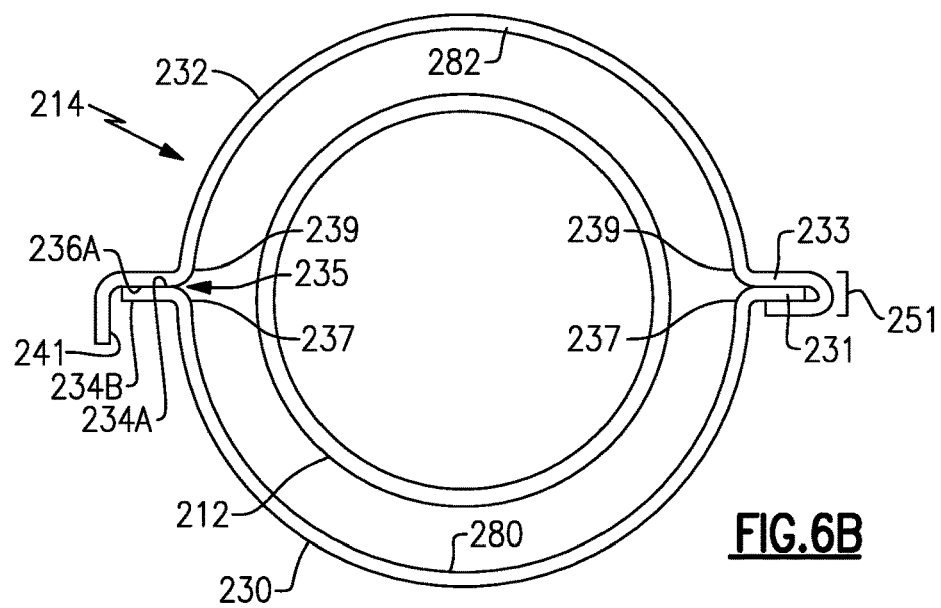
FIG. 6B illustrates a cross-sectional view taken along line 6B-6B of FIG. 6A.

Similarly, FIGS. 6A and 6B illustrate another example heat shield 214 surrounding the tube 112. The heat shield 214 is similar to the heat shield 114 except where described below or shown in the drawings. Like reference numeral designate like elements where appropriate with a leading "2."

The heat shield 214 includes a first heat shield half 230 and a second heat shield half 232 with the first heat shield half 230 on an inner side of a bend and the second heat shield half 232 on an outer side of the bend. The first heat shield half 230 includes an arc shaped segment 280 that extends between lateral edges 237 of the arc shaped segment 280. The first heat shield half 230 also includes a pair of straight flanges 231 that extend outward and generally perpendicular to a corresponding one of the lateral edges 237. The straight flanges 231 includes a first side having a first mating surface 234A and a second opposite side having a crimp engagement surface 234B. The straight flanges 231 are continuous between axial ends of the first heat shield half 230.

The second heat shield half 232 includes an arc shaped segment 282 that extends between lateral edges 239 of the arc shaped segment 282. The second heat shield half 232 also includes a crimp flange 233 having an "L" shape that extends outward and generally perpendicular to each of the lateral edges 239. The crimp flanges 233 include a first mating surface 236A for engaging the first mating surface 234A on the first heat shield half 232 to form a mating connection 235 between the first and second heat shield halves 230, 232. The crimp flanges 233 also include a crimp surface 241 for engaging the crimp engagement surface 234B on the first heat shield half 232 when the crimp flanges 233 are crimped around the straight flanges, creating a crimped section 251.

Notably, unlike FIGS. 4A-5B, in FIGS. 6A and 6B, the first heat shield half 230 is located on an inner side of a bend and the second heat shield half 232 is located on an outer side of the bend. Given there is only one of the crimp flanges 233 on each of the lateral edges 239 instead of a plurality of crimp flanges 133, having the crimp flange 233 on an outer side of the bend improves the ability of the crimp flange 233 to be securely crimped around a corresponding one of the straight flanges 231 to form a secure connection between the first and second heat shield halves 230, 232.

Effective insulation around the tubes 112 limits heat transfer and provides a barrier against moisture, which in turn helps improve the thermal efficiency and saves money. The heat shields 114 and 214 are easier and quicker to manufacture compared to prior designs and have improved effectiveness.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
   a compressor section;
   a diffuser case downstream of the compressor section;
   a combustor;
   a turbine section;
   a bearing compartment inward of the combustor;
   a shaft connecting the turbine section to the compressor section, and the bearing compartment including a bearing supporting the shaft, and
   a plurality of tubes extending to the bearing compartment, each of the plurality of tubes having a heat shield including a first half and a second half crimped together along lateral edges to form an internal circular shape, wherein the first half of the heat shield includes a plurality of flanges along each lateral edge of the first half and the second half includes a plurality of crimp flanges along each lateral edge of the second half.

2. The gas turbine engine as recited in claim 1, wherein at least one of the plurality of tubes supplies a source of air to the bearing compartment.

3. The gas turbine engine as recited in claim 2, wherein at least one of the plurality of tubes discharges air from the bearing compartment.

4. The gas turbine engine as recited in claim 3, wherein at least one of the plurality of tubes supplies a source of oil to the bearing compartment.

5. The gas turbine engine as recited in claim 4, wherein at least one of the plurality of tubes discharges oil from the bearing compartment.

6. The gas turbine engine as recited in claim 5, wherein the plurality of tubes extends through the diffuser case.

7. The gas turbine engine as recited in claim 1, wherein the plurality of tubes extends through the diffuser case.

8. A gas turbine engine comprising:
   a compressor section;
   a diffuser case downstream of the compressor section;
   a combustor;
   a turbine section;
   a bearing compartment inward of the combustor;
   a shaft connecting the turbine section to the compressor section, and the bearing compartment including a bearing supporting the shaft, and
   a plurality of tubes extending to the bearing compartment, each of the plurality of tubes having a heat shield including a first half and a second half crimped together along lateral edges to for an internal circular shape, wherein the first half of the heat shield includes a continuous crimp flange along each lateral edge and the second half of the heat shield includes a continuous flange along each lateral edge.

9. The gas turbine engine as recited in claim 8, wherein at least one of the plurality of tubes supplies a source of air to the bearing compartment.

10. The gas turbine engine as recited in claim 9, wherein at least one of the plurality of tubes discharges air from the bearing compartment.

11. The gas turbine engine as recited in claim 10, wherein at least one of the plurality of tubes supplies a source of oil to the bearing compartment.

12. The gas turbine engine as recited in claim 11, wherein at least one of the plurality of tubes discharges oil from the bearing compartment.

13. The gas turbine engine as recited in claim 12, wherein the plurality of tubes extends through the diffuser case.

14. A self-retaining heat shield comprising:
   a first heat shield half having an arc shape extending between a pair of lateral edges and the pair of lateral edges each include at least one first flange;
   a second heat shield half having an arc shape extending between a pair of lateral edges and the pair of lateral edges each include at least one second flange; and
   wherein one of the at least one first flange and the at least one second flange is a crimp flange and the other of the at least one first flange and the at least one second flange is a straight flange, the at least one first flange is aligned adjacent to the at least one second flange, the first heat shield half and the second shield half are crimped together to form an internal circular shape, the first half of the heat shield includes a continuous crimp flange along each lateral edge, and the second half of the heat shield includes a continuous flange along each lateral edge.

15. The self-retaining heat shield as recited in claim 14, wherein the crimp flange at least partially surrounds the straight flange.

16. The self-retaining heat shield as recited in claim 14, wherein the at least one first flange forms a mating connection with the at least one second flange.

17. A self-retaining heat shield comprising:
   a first heat shield half having an arc shape extending between a pair of lateral edges and the pair of lateral edges each include at least one first flange;
   a second heat shield half having an arc shape extending between a pair of lateral edges and the pair of lateral edges each include at least one second flange; and
   wherein one of the at least one first flange and the at least one second flange is a crimp flange and the other of the at least one first flange and the at least one second flange is a straight flange, the at least one first flange is aligned adjacent to the at least one second flange, the first heat shield half and the second heat shield half are crimped together to form an internal circular shape, the first half of the heat shield includes a plurality of flanges along each lateral edge of the first half, and the second half includes a plurality of crimp flanges along each lateral edge of the second half.

18. The self-retaining heat shield as recited in claim 17, wherein the crimp flange at least partially surrounds the straight flange.

19. The self-retaining heat shield as recited in claim 17, wherein the at least one first flange forms a mating connection with the at least one second flange.

* * * * *